(12) United States Patent
Schwamm et al.

(10) Patent No.: US 11,490,557 B2
(45) Date of Patent: Nov. 8, 2022

(54) SOWING COULTER WITH ADJUSTABLE BLADES

(71) Applicant: Amazonen-Werke H. Dreyer GmbH & Co. KG, Hasbergen (DE)

(72) Inventors: Victor Schwamm, Osnabrück (DE); Michael Troebner, Osnabrück (DE); Hubert Vollmer, Fürstenau (DE)

(73) Assignee: Amazonen-Werke H. Dreyer SE & Co. KG

( * ) Notice: Subject to any disclaimer, the term of this patent is extended or adjusted under 35 U.S.C. 154(b) by 197 days.

(21) Appl. No.: 16/484,692

(22) PCT Filed: Jan. 30, 2018

(86) PCT No.: PCT/EP2018/052184
§ 371 (c)(1),
(2) Date: Aug. 8, 2019

(87) PCT Pub. No.: WO2018/145939
PCT Pub. Date: Aug. 16, 2018

(65) Prior Publication Data
US 2020/0045874 A1    Feb. 13, 2020

(30) Foreign Application Priority Data
Feb. 13, 2017   (DE) .................... 102017102782.3

(51) Int. Cl.
*A01C 5/06*   (2006.01)
*A01B 15/02*  (2006.01)
(Continued)

(52) U.S. Cl.
CPC .............. *A01C 5/062* (2013.01); *A01B 15/02* (2013.01); *A01B 15/06* (2013.01); *A01B 71/02* (2013.01); *A01C 7/20* (2013.01); *A01C 7/203* (2013.01)

(58) Field of Classification Search
CPC ........... A01C 5/062; A01C 7/20; A01C 7/203; A01B 15/02; A01B 15/06; A01B 71/02
See application file for complete search history.

(56) References Cited

U.S. PATENT DOCUMENTS 349,916 A  *  9/1886  Woodley ................ A01B 15/02
                                                    172/704
1,544,795 A  *  7/1925  Barret .................... A01B 15/02
                                                    172/739
(Continued)

FOREIGN PATENT DOCUMENTS

DE         10327377 A1    1/2005
DE    10 2006 026 808 A1  12/2007
(Continued)

OTHER PUBLICATIONS

International Search Report issued in International Application No. PCT/EP2018/052184 dated May 8, 2018.
(Continued)

*Primary Examiner* — Thomas B Will
*Assistant Examiner* — Ian A Normile
(74) *Attorney, Agent, or Firm* — Mintz, Levin, Cohn, Ferris, Glovsky and Popeo, P.C.

(57) ABSTRACT

A sowing coulter for direct and/or mulch sowing includes a coulter body, a tear-open chisel fastened by a fastening device, and coulter blades laterally projecting from the tear-open chisel and provided with front cutting edges, which are arranged in order to create a sowing furrow in the ground. In order to change the penetration depth of the sowing coulter into the ground, the coulter blades are adjustable about a horizontal axis that extends transversely to the direction of travel, and that is fixable in different positions by way of an adjustment device arranged between the tear-open chisel and the coulter body.

3 Claims, 5 Drawing Sheets

Figure 1:
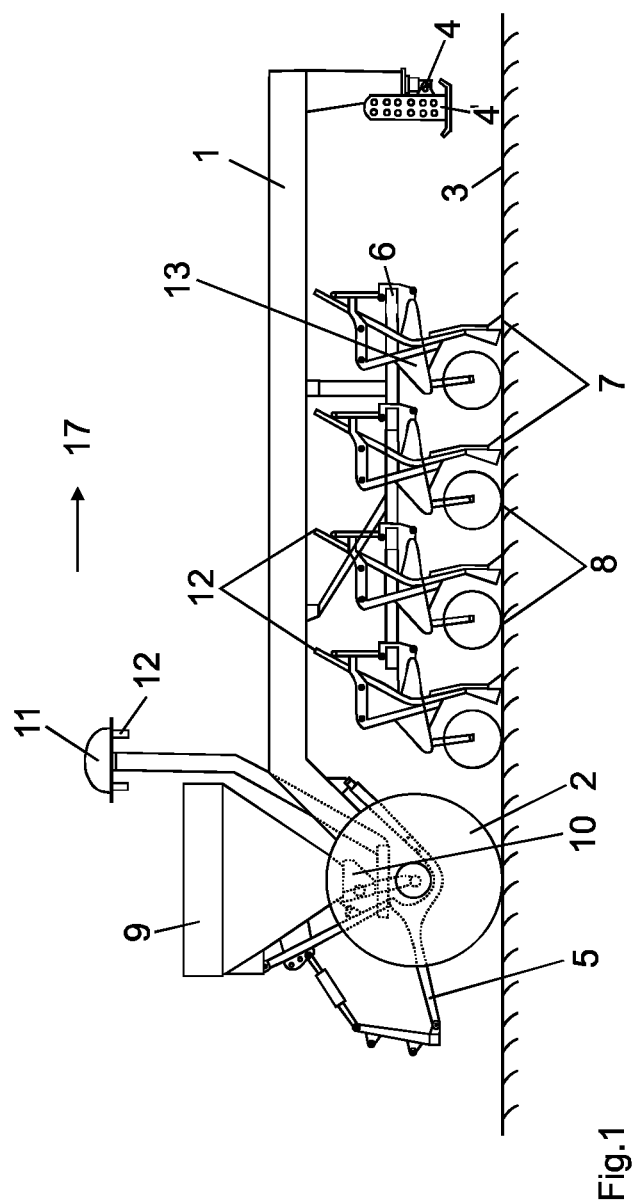

(51) Int. Cl.
*A01B 15/06* (2006.01)
*A01B 71/02* (2006.01)
*A01C 7/20* (2006.01)

(56) References Cited

U.S. PATENT DOCUMENTS

| | | | | |
|---|---|---|---|---|
| 2,080,741 A * | 5/1937 | Peterson | ................ | A01B 35/26 |
| | | | | 172/741 |
| 2,395,342 A * | 2/1946 | Morkoski | .............. | A01B 35/22 |
| | | | | 172/265 |
| 2,691,930 A * | 10/1954 | Forgy | ..................... | A01B 63/22 |
| | | | | 172/328 |
| 4,373,455 A * | 2/1983 | Friggstad | ................ | A01C 5/062 |
| | | | | 111/150 |
| 5,103,918 A | 4/1992 | Puntoni | | |
| 5,314,029 A | 5/1994 | Rowlett | | |
| 5,605,196 A | 2/1997 | Grimm et al. | | |
| 5,829,535 A * | 11/1998 | Line | ....................... | A01B 63/26 |
| | | | | 172/398 |
| 5,865,131 A | 2/1999 | Dietrich, Sr. et al. | | |
| 2009/0112475 A1* | 4/2009 | Christy | ................ | A01B 79/005 |
| | | | | 702/5 |
| 2010/0139938 A1* | 6/2010 | Henry | .................... | A01C 5/062 |
| | | | | 172/724 |
| 2011/0168068 A1* | 7/2011 | Senchuk | ................ | A01C 5/062 |
| | | | | 111/152 |
| 2011/0247845 A1* | 10/2011 | Greuel | .................... | E02F 9/123 |
| | | | | 172/677 |

FOREIGN PATENT DOCUMENTS

| | | | | |
|---|---|---|---|---|
| EP | 0169285 A2 * | 1/1986 | ........... | A01B 15/025 |
| EP | 0200967 A1 * | 11/1986 | ............. | A01C 5/062 |
| KR | 900002959 B1 * | 5/1990 | ............. | A01C 5/062 |

OTHER PUBLICATIONS

Office Action dated May 7, 2021 in corresponding Canadian Patent Application No. 3,052,717.

* cited by examiner

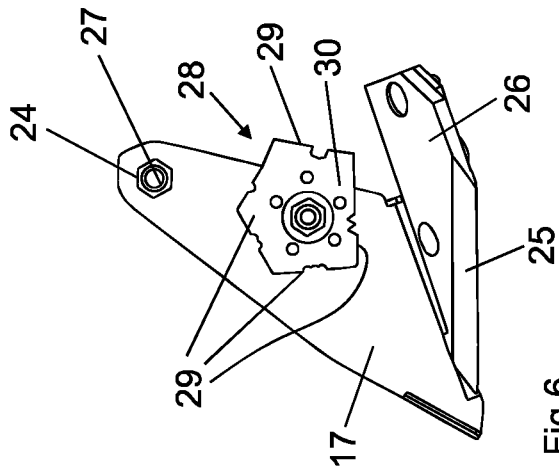
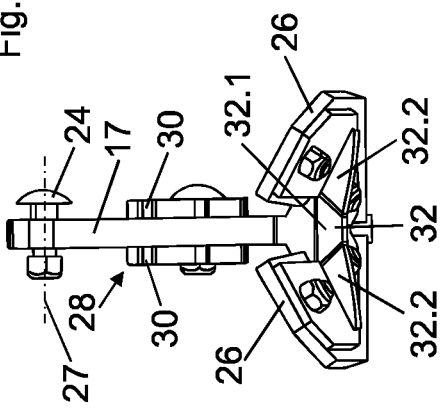
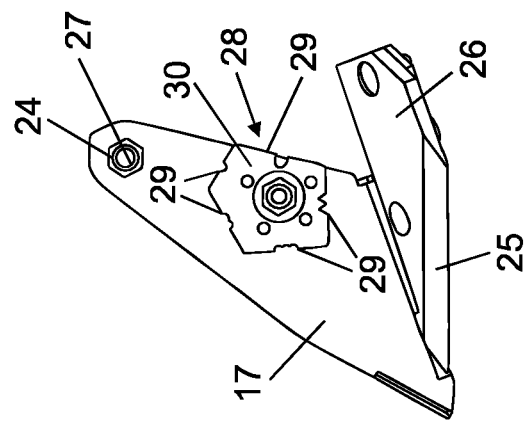

SOWING COULTER WITH ADJUSTABLE BLADES

The invention relates to a sowing coulter, in particular chisel coulter according to the preamble of claim 1.

Such a sowing coulter, in particular a chisel coulter, is known from DE 43 39 442 A1. In this sowing coulter, both the tear-open chisel and the coulter blades are arranged so that they are fixed in relation to the coulter body. When the coulter body is adjusted to adjust the penetration depth of the tear-open chisel and the coulter blades into the soil, the upright course of the front side of the tear-open coulter changes in relation to the vertical, as does the inclination angle of the coulter blades in relation to the working direction of the sowing coulter and to the soil surface or the sowing furrow bottom.

In order to at least partially remedy this situation, the sowing coulter in DE 10 2006 026 808 A1 is intended to attach the respective coulter blade to the coulter body in a freely oscillating manner about an axis running transversely to the working direction. This allows the respective coulter blade to align itself freely according to the forward movement of the sowing coulter, so that the coulter blade cuts through the soil in an optimized manner and does not dig through it.

It is known from U.S. Pat. No. 5,605,196 A1 that the respective coulter blade is attached to the tear-open chisel in an adjustable manner.

It is the object of the invention to create a simplified fastening of the coulter blades, and at the same time an improved adjustment of the tear-open chisel with the coulter blades with respect to the coulter body when the penetration depth of the sowing coulter into the soil changes, so that an optimized adjustment and orientation of the coulter blades to the soil at any penetration depth of the sowing coulter in the soil is maintained.

This object is achieved according to the invention in that the coulter blades are arranged on the tear-open chisel, that the tear-open chisel having the coulter blades is adjustable about a horizontal axis extending transversely to the direction of travel, and is fixable in different positions by way of an adjustment device arranged between the tear-open chisel and the coulter body.

As a result of this measure, the tear-open chisel together with the coulter blades arranged on it can be easily adjusted to the optimized position in relation to the soil surface or the sowing furrow bottom to compensate for the change in the inclination of the coulter body when the penetration depth of the sowing coulter in the soil changes.

A simple determination of the position of the tear-open chisel with the coulter blades relative to the coulter body to compensate for the change in the inclination of the coulter body is achieved in that the adjustment device comprises at least one adjustment element which is rotatable about a horizontal axis running transversely to the direction of travel and is of eccentric design and comprises adjustment surfaces arranged at different distances from the axis of rotation.

A secure fixing of the adjustment element with respect to the coulter body so that no independent adjustment of the adjustment element can occur in the rough agricultural sowing operation is achieved in that at least one positively interlocking projection and a complementary depression are arranged between the at least one adjustment element and the coulter body.

In order to ensure uniform distribution of the material supplied to the sowing coulter for placement in the sowing furrow, it is provided that the coulter body has assigned thereto at least one material supply line opening out in at least one line mouth in the lower region of the coulter body, that a roof-shaped impact plate is arranged below the coulter blades and the at least one line mouth.

A simple design for achieving uniform distribution of the material impinging on the impact surface can be achieved in that the roof-shaped impact plate comprises a central, preferably flat, center impact surface sloping rearwards and lateral impact surfaces sloping laterally from the side regions of this center impact surface in each case.

Further details can be found in the example description and the drawings.

Figure 2:
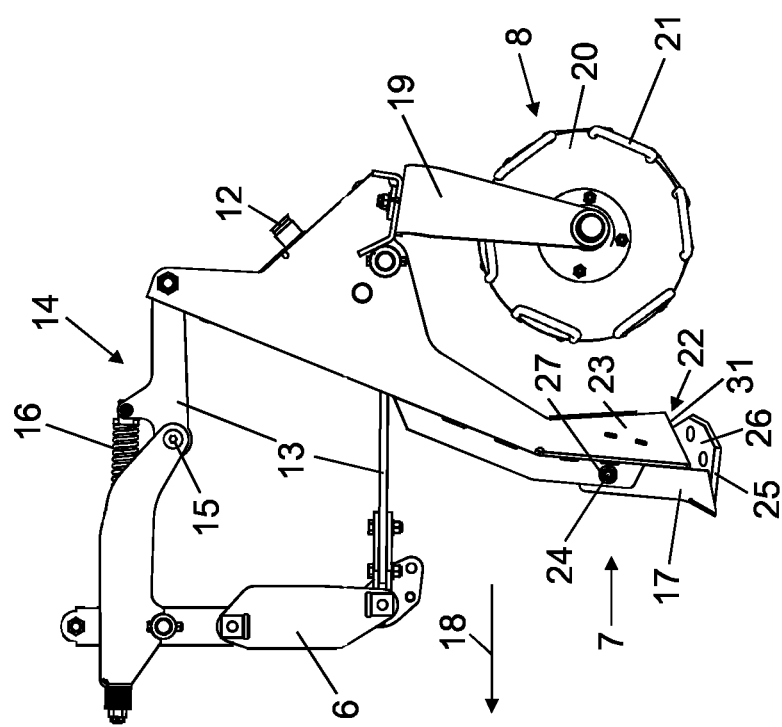
Figure 3:
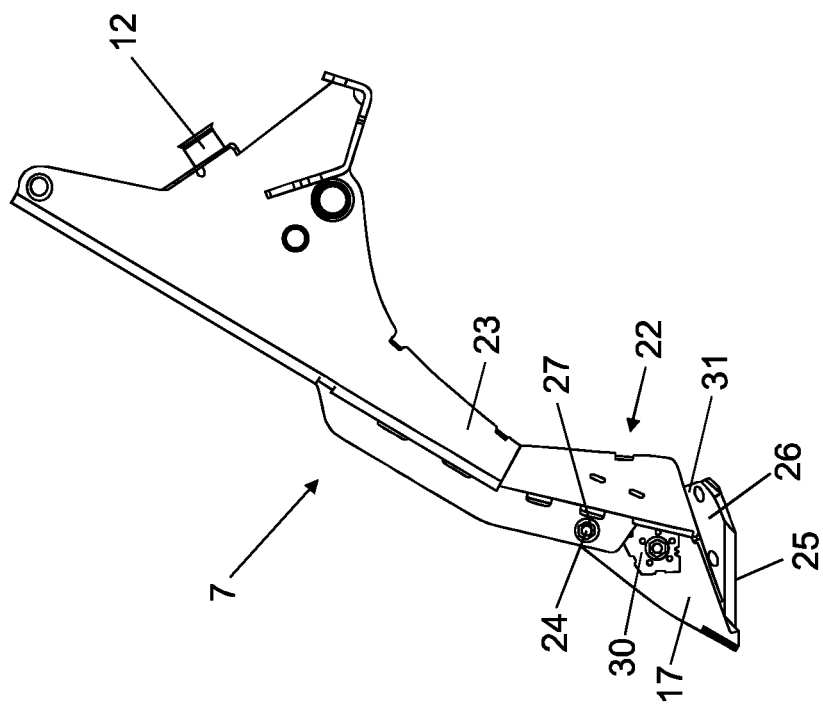
Figure 4:
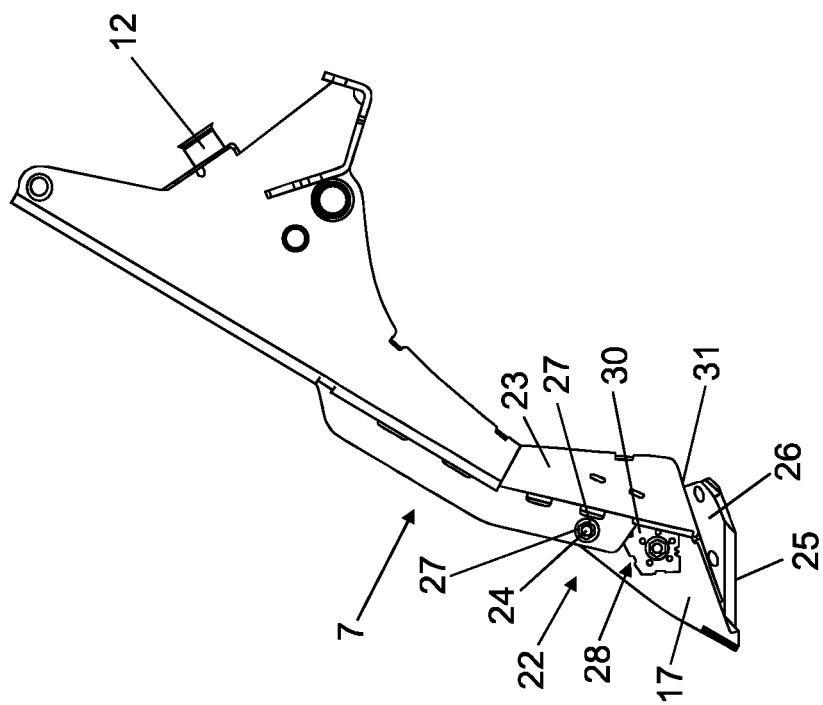

FIG. 1 depicts a sowing machine with the sowing coulters according to the invention in simplified principle representation and side view, FIG. 2 depicts a sowing coulter according to the invention with a first adjustment of the tear-open chisel in principle representation in side view, FIG. 3 depicts the sowing coulter in a different depth adjustment with the first adjustment of the tear-open chisel according to FIG. 2 in principle representation in side view, FIG. 4 depicts the sowing coulter in a different adjustment of the tear-open chisel and a changed inclination of the sowing coulter in principle representation in side view, FIG. 5 depicts the tear-open chisel with the adjustment of the adjustment element according to FIGS. 2 and 3 on an enlarged scale and in side view, FIG. 6 depicts the tear-open chisel with the adjustment of the adjustment element according to FIG. 4 on an enlarged scale and in side view and FIG. 7 depicts the tear-open chisel in rear view.

The sowing machine used for direct sowing and mulch sowing comprises the elongated carrying frame 1, which is supported on the soil 3 via running wheels 2. The front of the carrying frame 1 comprises the pulling and coupling device 4 for coupling to the three-point linkage of an agricultural tractor. The height-adjustable supports 4' can be arranged on the coupling device 4. The coupling device 5 which can be hydraulically lifted and lowered by hydraulic elements for coupling working tools, e.g. harrows, is arranged on the rear side of the carrying frame 1. In front of the running wheels 2, the sowing coulters, which in this embodiment are configured as chisel sowing coulters 7, are arranged on the carrying frame 1 via the carrying device 6 with the rollers 8 which guide the chisel sowing coulters 7 in their depth into the soil. The hopper 9 is arranged on the carrying frame. Via a pneumatic conveying and metering device 10, the seed in the hopper 9 is fed to the sowing coulters 7 via the distributor heads 11 and the seed lines 12.

The chisel sowing coulters 7 are arranged on the carrying elements 6 via holders designed as parallelogram holders 13. The parallelogram-shaped holder 13 has a two-part upper strut 14 in which the two parts of the two-part upper strut 14 are connected to each other by a joint 15. The two parts of the two-part upper strut 14 are held in an extended position by means of the spring 16. In the embodiment, the chisel sowing coulter 7 comprises a tear-open chisel 17 in an engaged position. However, it is also possible that the front lower part of the tear-open chisel 7 is inclined downwards to the rear in such a way that the coulter tip is trailing in relation to the other front parts. The direction of travel and working is indicated by the arrow 18.

A load device not shown can be assigned to the parallelogram-type holder 13 in order to adjust the coulter pressure and thus also to ensure safe penetration of the tear-open chisel 17 of the chisel sowing coulter 7 even in hard soil. Furthermore, the pressure force acting on the depth guide rollers 8 for pressing the soil into the sowing furrow can thereby be varied.

Each chisel sowing coulter 7 has assigned thereto two depth guide rollers 8, which are arranged in the known way oppositely slanted and inclined to a V opening in the direction of travel 18. The two rollers 8 are fastened to the coulter 7 by means of a holder 19.

The rollers 8 comprise a disc-shaped holding disc 20. On the free outer circumferential edge area of the disc-like and planar flat holding disc 20, support or pressure rods 21 projecting in radial direction are arranged at a distance from each other. The support and pressure rods 21 are U-shaped or ring-shaped.

In the lower area 22 of the coulter body 23 of the chisel coulter 7, in its lower front area and on the front side of the coulter body 23, the tear-open chisel 17, which is fastened by means of a fastening device 24, is fastened so as to be pivotable to a limited extent.

On both sides, laterally protruding coulter blades 26 provided with a front cutting edge 25 are arranged on the tear-open chisel 17 to create a sowing furrow in the soil. The coulter blades 26 are arranged on the tear-open chisel 17. The tear-open chisel 17 is arranged with the coulter blades 26 to be adjustable about a horizontal axis 27 running transversely to the direction of travel 18 in relation to the coulter body 23 and can be fixed in different positions via an adjustment device 28 arranged between the tear-open chisel 17 and the coulter body 23. This fastening enables the tear-open chisel 17 together with the coulter blades 26 arranged on it to be easily shifted to the optimized position in relation to the soil surface or sowing furrow bottom relative to the coulter body 23 to compensate for the change in the inclination of the coulter body 17 when the penetration depth of the sowing coulter 7 in the soil changes and thus to be adjusted to an optimized position.

The adjustment device 28 comprises at least one adjustment element 30 which is rotatable about a horizontal axis extending transversely to the direction of travel 18 and is of eccentric design and comprises adjustment surfaces 29 arranged at different distances from the axis of rotation. At least one positively interlocking projection (not shown) and a complementary depression are arranged between the at least one adjustment element 30 and the coulter body 23. This ensures a reliable fixing of the adjustment element 30 with respect to the coulter body 23 so that there is no independent shifting of the adjustment element 30 in the rough agricultural sowing operation. Therefore, a simple determination of the position of the tear-open chisel with the coulter blades 26 with respect to the coulter body 23 is thus provided for compensating for the change in the inclination of the coulter body 23.

The coulter body 23 has assigned thereto at least one material supply line 12 which opens out in the lower area of the coulter body 23 in at least one line mouth 31. The material to be spread, such as seed and/or fertilizer, is fed in adjustable quantities to the sowing coulter 7 via this material feed line 12. A roof-shaped impact plate 32 is arranged below the coulter blades 26 and the at least one line mouth 31. The roof-shaped impact plate 32 comprises a central, preferably flat, center impact surface 32.1 sloping rearwards and side impact surfaces 32.2 sloping laterally from the side regions of this center impact surface 32.1 in each case. The impact of the seed and/or fertilizer grains emerging from the line mouth of the material supply line 12 results in an even distribution of the material supplied to the sowing coulter for placement in the sowing furrow.

The invention claimed is:

1. A sowing coulter, comprising:
   a coulter body;
   a tear-open chisel arranged at a lower front region of the coulter body, the tear-open chisel being fastened to the coulter body by a fastening device;
   and
   coulter blades laterally projecting from the tear-open chisel and provided with a front cutting edge so as to create a sowing furrow in the soil,
   wherein the coulter blades are arranged on the tear-open chisel,
   wherein the tear-open chisel having the coulter blades is adjustable about a horizontal axis extending transversely to a direction of travel,
   wherein the tear-open chisel is fixable in different positions relative to the coulter body by an adjustment device arranged between the tear-open chisel and the coulter body,
   wherein the adjustment device comprises at least one adjustment element which is configured to be rotated about a second horizontal axis running transversely to the direction of travel and is of eccentric design and comprises adjustment surfaces which are arranged at different distances from the second horizontal axis, and
   wherein at least one positively interlocking projection and a complementary depression are arranged between the at least one adjustment element and the coulter body.

2. The sowing coulter according to claim 1, wherein the coulter body has assigned thereto at least one material supply line opening out in at least one line mouth in the lower front region of the coulter body, and a roof-shaped impact plate is arranged below the coulter blades and the at least one line mouth.

3. The sowing coulter according to claim 2, wherein the roof-shaped impact plate comprises a center impact surface which slopes rearwards and lateral impact surfaces which slope laterally from side regions of said center impact surface.

* * * * *